US008382207B2

(12) United States Patent
Altemeier

(10) Patent No.: US 8,382,207 B2
(45) Date of Patent: Feb. 26, 2013

(54) THREE POINT LINKAGE SYSTEMS

(76) Inventor: Mark Altemeier, Maineville, OH (US)

( * ) Notice: Subject to any disclaimer, the term of this patent is extended or adjusted under 35 U.S.C. 154(b) by 284 days.

(21) Appl. No.: 12/886,714

(22) Filed: Sep. 21, 2010

(65) Prior Publication Data

US 2012/0070259 A1 Mar. 22, 2012

(51) Int. Cl.
*A01B 59/04* (2006.01)

(52) U.S. Cl. ........................................................ 298/22 P

(58) Field of Classification Search .................. 298/22 P
See application file for complete search history.

(56) References Cited

U.S. PATENT DOCUMENTS

| | | | | |
|---|---|---|---|---|
| 2,743,117 | A | 10/1953 | Hutchings | |
| 4,019,755 | A | 4/1977 | Eisenhardt | |
| 4,181,181 | A | 1/1980 | Old | |
| 4,184,757 | A | 1/1980 | Kondo | |
| 4,519,623 | A | 5/1985 | Orthman | |
| 5,346,018 | A * | 9/1994 | Koster | 172/47 |
| 5,423,394 | A | 6/1995 | Kendle | |
| 5,601,146 | A * | 2/1997 | Schlegel et al. | 172/439 |
| 5,707,072 | A | 1/1998 | Hopper | |
| 5,746,275 | A | 5/1998 | Cross et al. | |
| 5,829,536 | A | 11/1998 | Pigg et al. | |
| 5,971,082 | A | 10/1999 | Satzler | |
| 5,975,216 | A | 11/1999 | Gibbons | |
| 5,988,294 | A | 11/1999 | Hubscher | |
| 6,044,915 | A * | 4/2000 | Schlegel et al. | 172/439 |
| 6,089,328 | A | 7/2000 | Moore et al. | |
| 6,148,928 | A * | 11/2000 | Spears | 172/439 |
| 6,257,347 | B1 | 7/2001 | Campisi | |
| 6,371,217 | B1 * | 4/2002 | Boden | 172/450 |
| 6,443,236 | B2 | 9/2002 | Staude | |
| 6,478,094 | B2 | 11/2002 | Alexander et al. | |
| 6,588,513 | B1 | 7/2003 | Gustafson | |
| 6,591,918 | B1 * | 7/2003 | Wojewodzki et al. | 172/450 |
| 6,732,811 | B1 * | 5/2004 | Elliott | 172/445.1 |
| 6,796,384 | B1 | 9/2004 | Potter | |
| 7,063,169 | B2 * | 6/2006 | Elliott | 172/445.1 |
| 7,174,967 | B2 * | 2/2007 | Raimondo et al. | 172/439 |
| 7,658,235 | B2 * | 2/2010 | Dahl et al. | 172/449 |
| 7,686,097 | B2 * | 3/2010 | Mozingo et al. | 172/450 |
| 7,861,794 | B2 * | 1/2011 | Tarasinski et al. | 172/439 |

* cited by examiner

*Primary Examiner* — H Gutman
(74) *Attorney, Agent, or Firm* — Dinsmore & Shohl LLP

(57) ABSTRACT

A three-point linkage system includes a frame, an upper lift arm assembly pivotally mounted to the frame and a lower lift arm assembly pivotally mounted to the frame. The lower lift arm assembly is linked to the upper lift arm assembly for movement therewith. An actuator is connected to the frame and the upper lift arm assembly to move the upper lift arm assembly and the lower lift arm assembly linked to the upper lift arm assembly relative to the frame. A top link arm is pivotally connected to the upper lift arm assembly such that the top link arm moves with the upper lift arm assembly as the upper lift arm assembly is moved by the actuator. The top link arm including connecting structure for connecting the top link arm to an implement.

18 Claims, 8 Drawing Sheets

THREE POINT LINKAGE SYSTEMS

TECHNICAL FIELD

The present specification generally relates to linkage systems for vehicles and, more particularly, to three-point linkages for attaching implements to the vehicles.

BACKGROUND

Three-point hitches are often used to attach implements to a work machine. The three point attachment is a reliable way of joining the implement to the work machine. Often, the three-point hitches include a hitch tube that can be received by a receiver hitch on the work machine, which causes the receiver hitch to be occupied. Other three-point hitch arrangements are desired.

SUMMARY

In one embodiment, a three-point linkage system includes a frame, an upper lift arm assembly pivotally mounted to the frame and a lower lift arm assembly pivotally mounted to the frame. The lower lift arm assembly is linked to the upper lift arm assembly for movement therewith. An actuator is connected to the frame and the upper lift arm assembly to move the upper lift arm assembly and the lower lift arm assembly linked to the upper lift arm assembly relative to the frame. A top link arm is pivotally connected to the upper lift arm assembly such that the top link arm moves with the upper lift arm assembly as the upper lift arm assembly is moved by the actuator. The top link arm including connecting structure for connecting the top link arm to an implement.

In another embodiment, a utility vehicle system includes a utility vehicle including a vehicle frame including upper support beams that extend from front to rear of the utility vehicle on opposite sides of the utility vehicle and an upper transverse support beam that extends between the upper support beams. A hitch receiver is connected to the vehicle frame. A three-point linkage system includes a linkage frame and a hitch tube connected to the linkage frame. The hitch tube is received by the hitch receiver. An attachment is connected to the linkage frame. The attachment includes a clamp that is connected to the upper transverse support beam of the utility vehicle. An upper lift arm assembly is pivotally mounted to the linkage frame. A lower lift arm assembly is pivotally mounted to the linkage frame. The lower lift arm assembly is linked to the upper lift arm assembly for movement therewith. An actuator is connected to the linkage frame and the upper lift arm assembly to move the upper lift arm assembly and the lower lift arm assembly linked to the upper lift arm assembly relative to the linkage frame. A top link arm is pivotally connected to the upper lift arm assembly such that the top link arm moves with the upper lift arm assembly as the upper lift arm assembly is moved by the actuator. The top link arm includes connecting structure for connecting the top link arm to an implement.

In another embodiment, a method of providing a three-point linkage for a utility vehicle includes mounting a three-point linkage system to the utility vehicle by inserting a hitch tube connected to a linkage frame of the three-point linkage system into a hitch receiver provided by the utility vehicle and clamping an attachment connected to the linkage frame of the three-point linkage system to a vehicle frame of the utility vehicle; connecting an upper lift arm assembly to an implement, the upper lift arm assembly pivotally mounted to the linkage frame; connecting a lower lift arm assembly to the implement, the lower lift arm assembly pivotally mounted to the linkage frame, the lower lift arm assembly being linked to the upper lift arm assembly for movement therewith; and connecting a top link arm to the implement, the top link arm pivotally connected to the upper lift arm assembly such that the top link arm moves with the upper lift arm assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to three-point linkage systems that can be used to attach an implement to a work machine, such as an utility vehicle. The three-point linkage systems may have a relatively low profile to allow for continued use of devices in proximity to the three-point linkage systems, such as lifting and lowering of a cargo bed on the utility vehicle.

Figure 1:
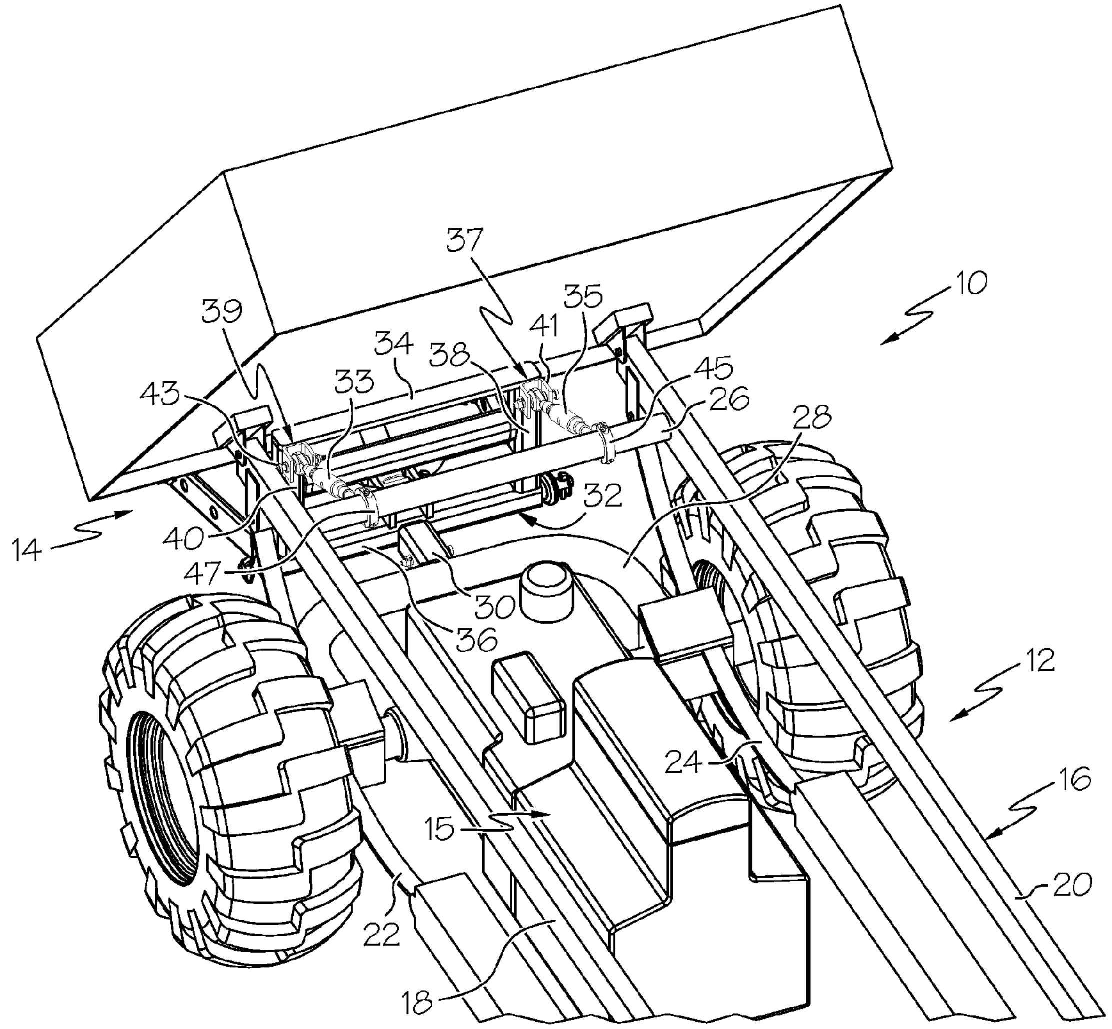
FIG. 1 is a top, perspective view of an utility vehicle system including a utility vehicle and a three-point linkage system connected thereto according to one or more embodiments described herein.

Referring to FIG. 1, a utility vehicle system 10 includes a utility vehicle 12 and a three-point linkage system 14. The utility vehicle 12 includes a frame 16, a body (not shown) and a hydraulic system with pressurized fluid source, generally indicated as element 15. The frame 16 includes upper support beams 18 and 20 that extend from the rear to the front of the utility vehicle 12 and lower support beams 22 and 24 that also extend from the rear to the front of the utility vehicle 12. Extending between the upper support beams 18 and 20 is an upper transverse support beam 26 that extends from one side to the other side at the rear of the utility vehicle 12. Extending between the lower support beams 22 and 24 is a lower transverse support beam 28 that extends from one side to the other side at the rear of the utility vehicle 12. A receiver hitch 30 is supported by the frame 16 and extends from the rear of the utility vehicle 12.

Figure 2:
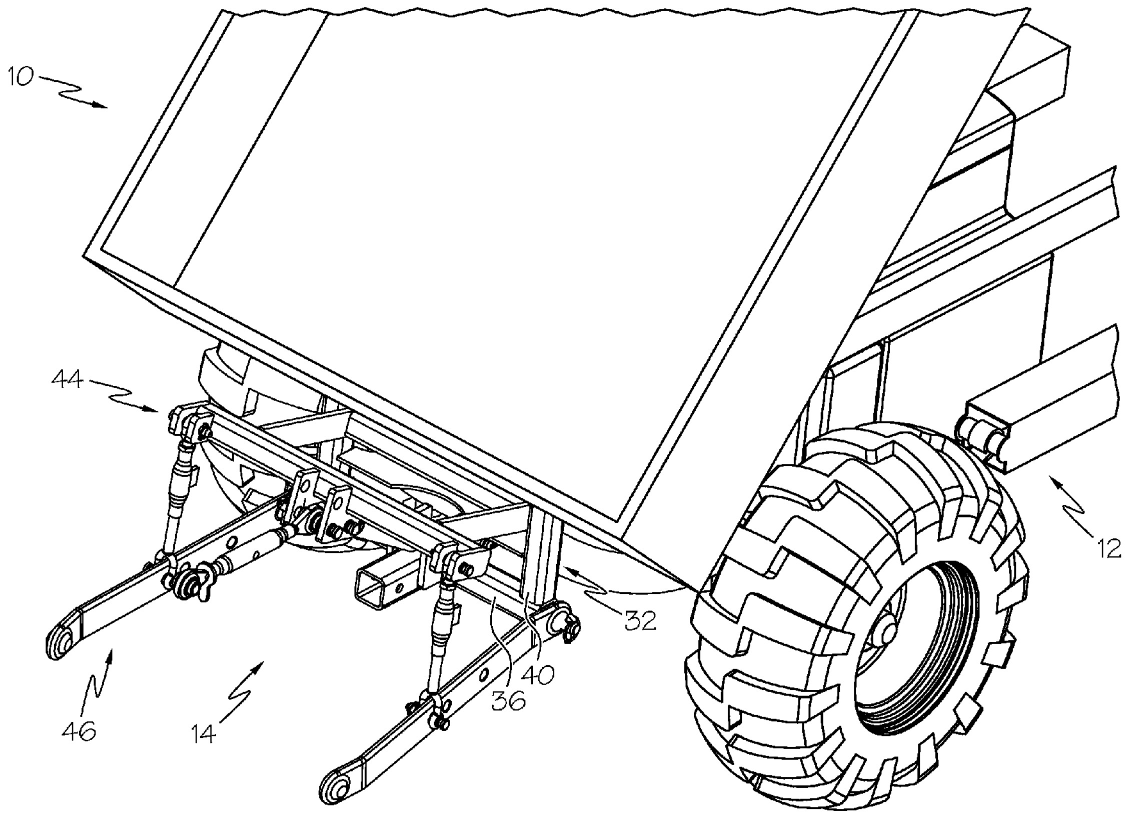
FIG. 2 is rear, perspective view of the utility vehicle system including the utility vehicle and the three-point linkage system connected thereto according to one or more embodiments described herein.
Figure 3:
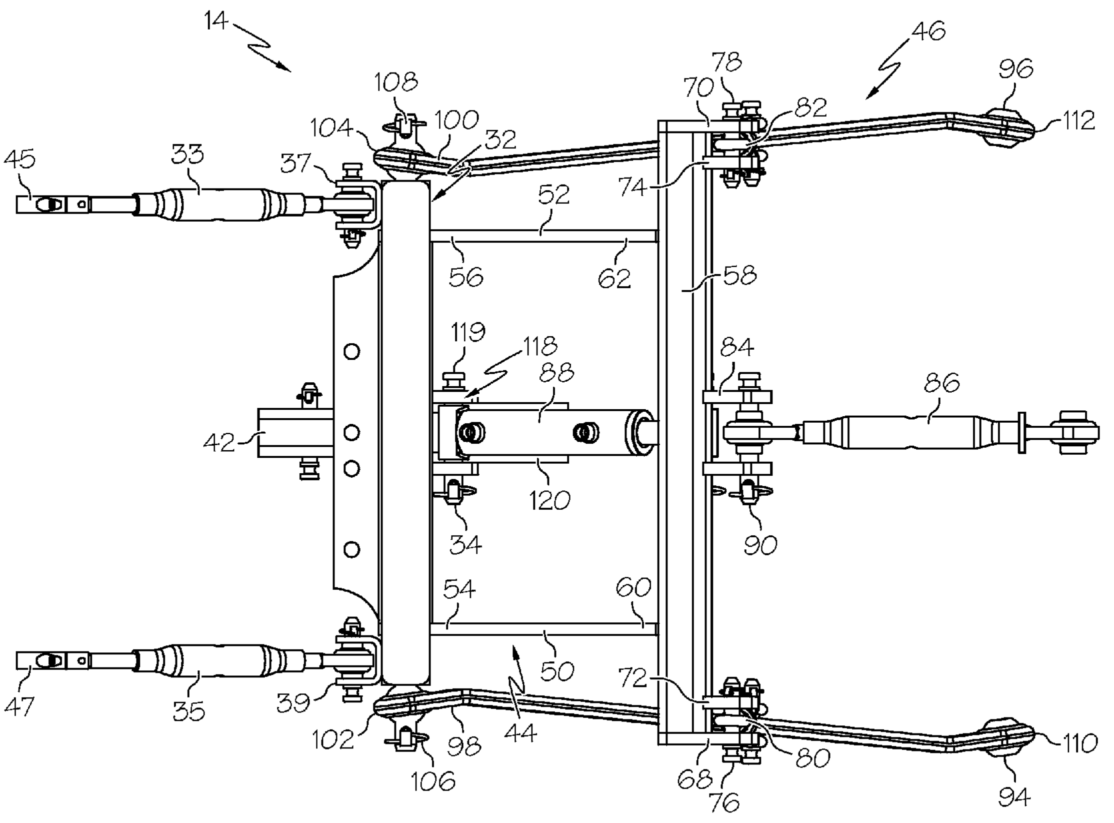
FIG. 3 is a top view of the three point linkage system of FIG. 1 according to one or more embodiments described herein.

The three-point linkage system 14 is connected to the utility vehicle 12 at the receiver hitch 30 and at the upper transverse support beam 26 using a pair of turnbuckle attachments 33 and 35. Referring also to FIG. 2, the three-point linkage system 14 includes a stationary frame 32 that includes a top transverse frame bar 34, a bottom transverse frame bar 36 and vertical side frame bars 38 and 40 that extend vertically between the top and bottom transverse frame bars 34 and 36. Rigidly connected to the bottom transverse frame bar 36 is a hitch tube 42 (FIG. 3). The hitch tube 42 extends horizontally from the frame 32 generally in the frontward direction. The turnbuckle attachments 33 and 35 are connected directly to the frame 32 (e.g., at the top transverse frame bar 34 and/or the vertical side frame bars 38 and 40) using rear mounts 37 and 39. Pins 41 and 43 may be used to rotatably connect the turnbuckle attachments 33 and 35 to the frame 32. The turnbuckle attachments 33 and 35 may include clamps 45 and 47 that are sized to fit about the upper transverse support beam 26 to connect the three-point linkage system 14 to the utility vehicle 12.

Figure 4:
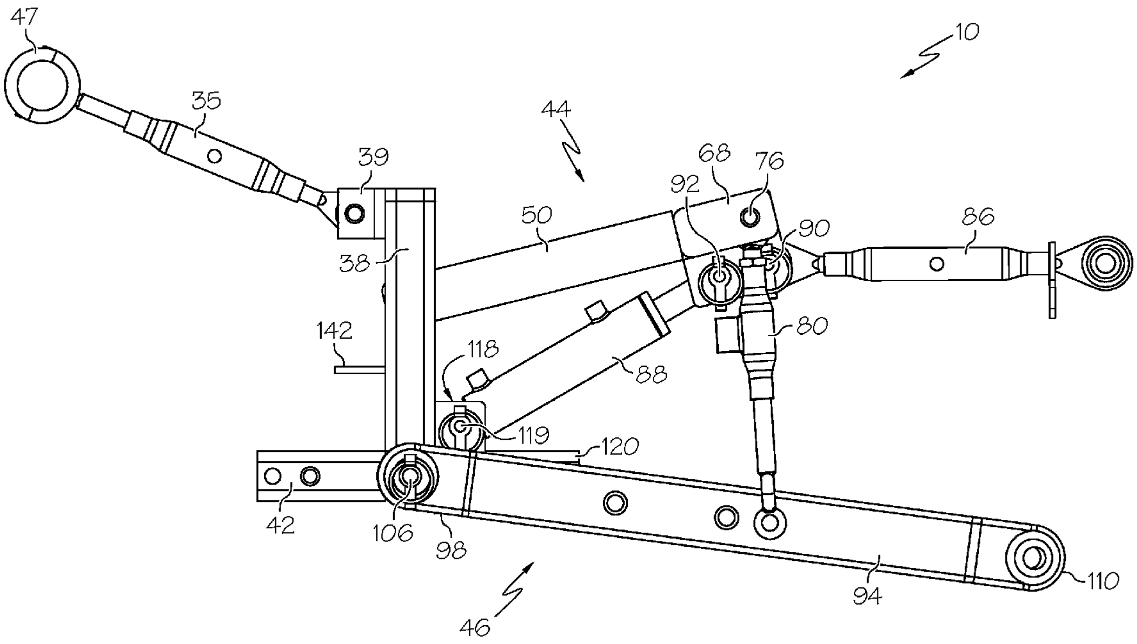
FIG. 4 is a side view of the three-point linkage system of FIG. 3 according to one or more embodiments described herein.
Figure 5:
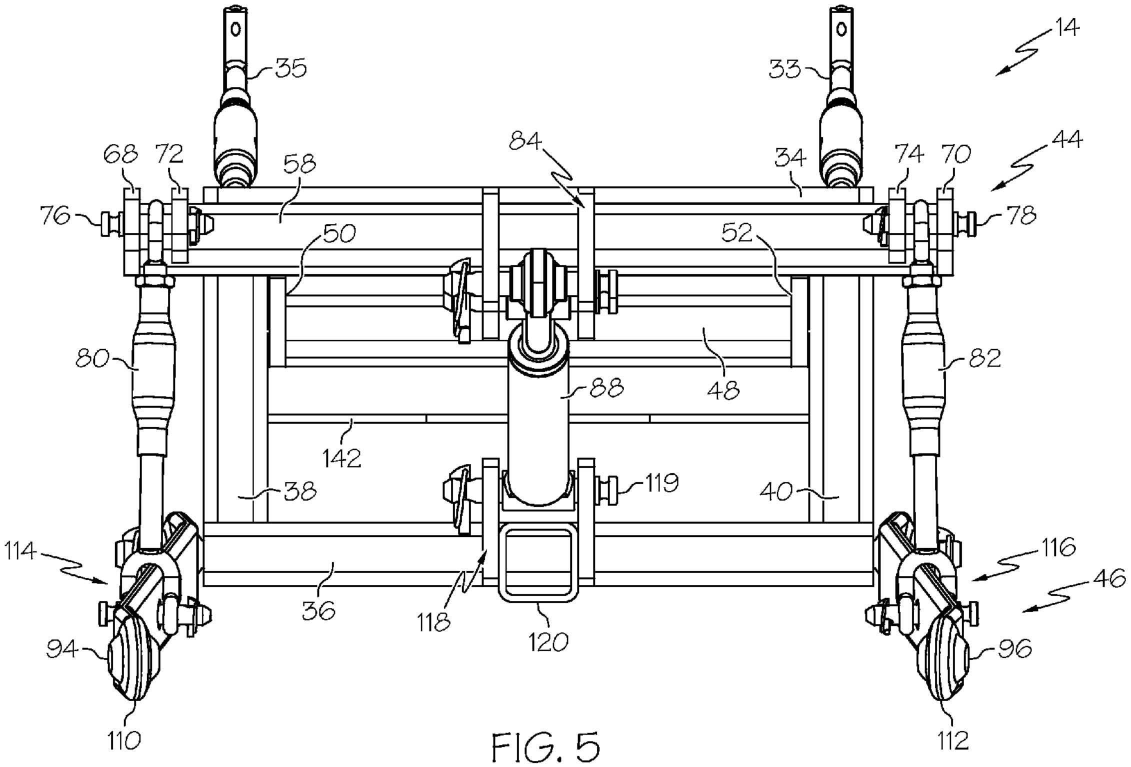
FIG. 5 is a rear view of the three-point linkage system of FIG. 3 according to one or more embodiments described herein.

An upper lift arm assembly 44 and a lower lift arm assembly 46 are pivotally connected to the frame 32 such that they can pivot up and down relative to the frame 32. Referring to FIGS. 3-5, the upper lift arm assembly 44 includes an inner transverse beam 48 that is pivotally connected between the side frame bars 38 and 40 and between the top and bottom transverse frame bars 34 and 36. A pair of upper lift arms 50 and 52 extend rearward from the inner transverse beam 48 and are rigidly connected thereto at their inner ends 54 and 56 such that they can pivot with the inner transverse beam 48 relative to the frame 32. An outer transverse beam 58 is connected to outer ends 60 and 62 of the upper lift arms 50 and 52 thereby spanning a gap between the upper lift arms 50 and 52. In some embodiments, such as shown, the outer transverse beam 58 may have a length that is greater than a distance between the upper lift arms 50 and 52 such that the outer transverse beam 58 extends outwardly beyond the upper lift arms 50 and 52 in the side-to-side direction. Extending rearward of the outer transverse beam 58 at its ends 64 and 66 are outer yoke members 68 and 70 and inner yoke members 72 and 74. The inner and outer yoke members 72, 68 and 74, 70 cooperate to receive pins 76 and 78. The pins 76 and 78 may be used to link the upper lift arm assembly 44 to the lower lift arm assembly 46 using adjustable link arms 80 and 82. A central mount 84 is located between the inner yoke members 72 and 74. The central mount 84 is connected directly to the outer transverse beam 58. The central mount 84 is rigidly connected to the outer transverse beam 58 and may be used to connect both a top link arm 86 and a hydraulic actuator 88 directly to the outer transverse beam 58. In some embodiments, there may be more than one central mount for connecting the top link arm 86 and the hydraulic actuator 88 directly to the outer transverse beam 58. A pin 90 may be used to rotatably connect the top link arm 86 to the outer transverse beam 58 and pin 92 may be used to rotatably connect the hydraulic actuator 88 to the outer transverse beam 58.

The lower lift arm assembly 46 includes a pair of lower lift arms 94 and 96 that are linked to both the outer transverse beam 58 and the frame 32. At inner ends 98 and 100 of the lower lift arms 94 and 96, the lower lift arms 94 and 96 are pivotally connected at outer surfaces 102 and 104 of the vertical side frame bars 38 and 40. Rods 106 and 108 may be used to pivotally connect the lower lift arms 94 and 96 to the frame 32. The lower lift arms 94 and 96 extend in a rearward direction to outer ends 110 and 112. The lower lift arms 94 and 96 are linked to the outer transverse beam 58 of the upper lift arm assembly 44 using the adjustable link arms 80 and 82. Referring particularly to FIG. 5, the adjustable link arms 80 and 82 may include yoke-type attachment structures 114 and 116 that are used to pivotally link the adjustable link arms 80 and 82 to the lower lift arms 94 and 96 at a location between the ends 98, 100 and 110, 112.

Referring to FIG. 5, the hydraulic actuator 88 is connected directly to the outer transverse beam 58 and the bottom transverse frame bar 36. In some embodiments, the hydraulic actuator 88 may be connected to the bottom transverse frame bar 36 by a cylinder mount assembly 118 that includes a pin 119 that pivotally connects the hydraulic actuator 88 to the bottom transverse frame bar 36. While a hydraulic actuator 88 is referred to above, other suitable actuators may be employed such at pneumatic actuators or motor-driven actuators, as examples. A receiver hitch 120 extends rearwardly from the bottom transverse frame bar 36. The receiver hitch 120 may be provided to receive an additional hitch tube so that the three-point linkage system 14 need not be removed to expose the receiver hitch 30 of the utility vehicle 12.

Figure 6:
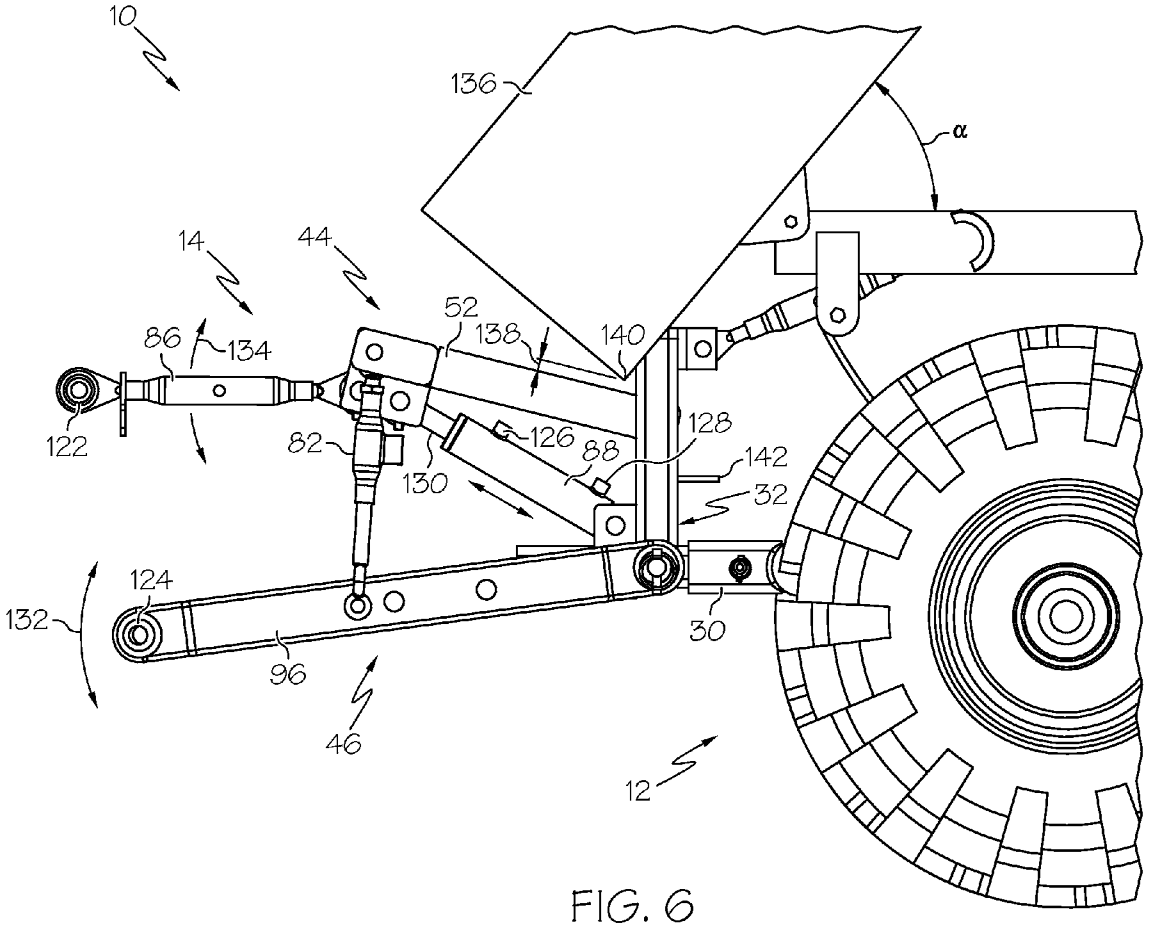
FIG. 6 is a side view of the utility vehicle system of FIG. 1 in operation according to one or more embodiments described herein.

Referring now to FIG. 6, the three-point linkage system 14 is illustrated connected to the utility vehicle 12 as if it was linked to an implement (omitted for clarity). As can be seen, the top link arm 86 and the lower lift arms 94 and 96 each include connection structures 122 and 124 (e.g., openings), respectively, that provide the three-point connection locations for connecting the three-point linkage system 14 to the implement. The implement may include rods or other connection structures that are received by the connection structures 122 and 124 for connection to the three-point linkage system 14. The hydraulic actuator 88 includes connectors 126 and 128 that connect the hydraulic actuator 88 to the utility vehicle's hydraulic system 15. Extending and retracting the rod 130 of the hydraulic actuator 88 lifts and lowers the upper lift arm assembly 44 and the lower lift arm assembly 46 in the direction of arrows 132 due to the linkage between the upper lift arm assembly 44 and the lower lift arm assembly 46. The lower lift arms 94 and 96 may be used for primary lifting of the implement. The top link arm 86 is connected directly to the upper lift arm assembly 44 and is raised and lowered therewith. The top link arm 86 may also pivot in the direction of arrows 134 relative to the upper lift arm assembly 44.

The three-point linkage system 14 provides a relatively lowered profile that can allow for operation of various utility vehicle systems, such as the cargo bed 136. FIG. 6 illustrates the three-point linkage system 14 in a raised position with the cargo bed 136 also in a raised position (e.g., having a raised angle $\alpha$ of greater than 15 degrees). In these raised positions, clearance 138 is provided between the upper lift arm assembly 44 and the lowest point 140 of the cargo bed 136 such that the upper lift arm assembly 44 does not interfere with operation of the cargo bed 136.

Figure 7:
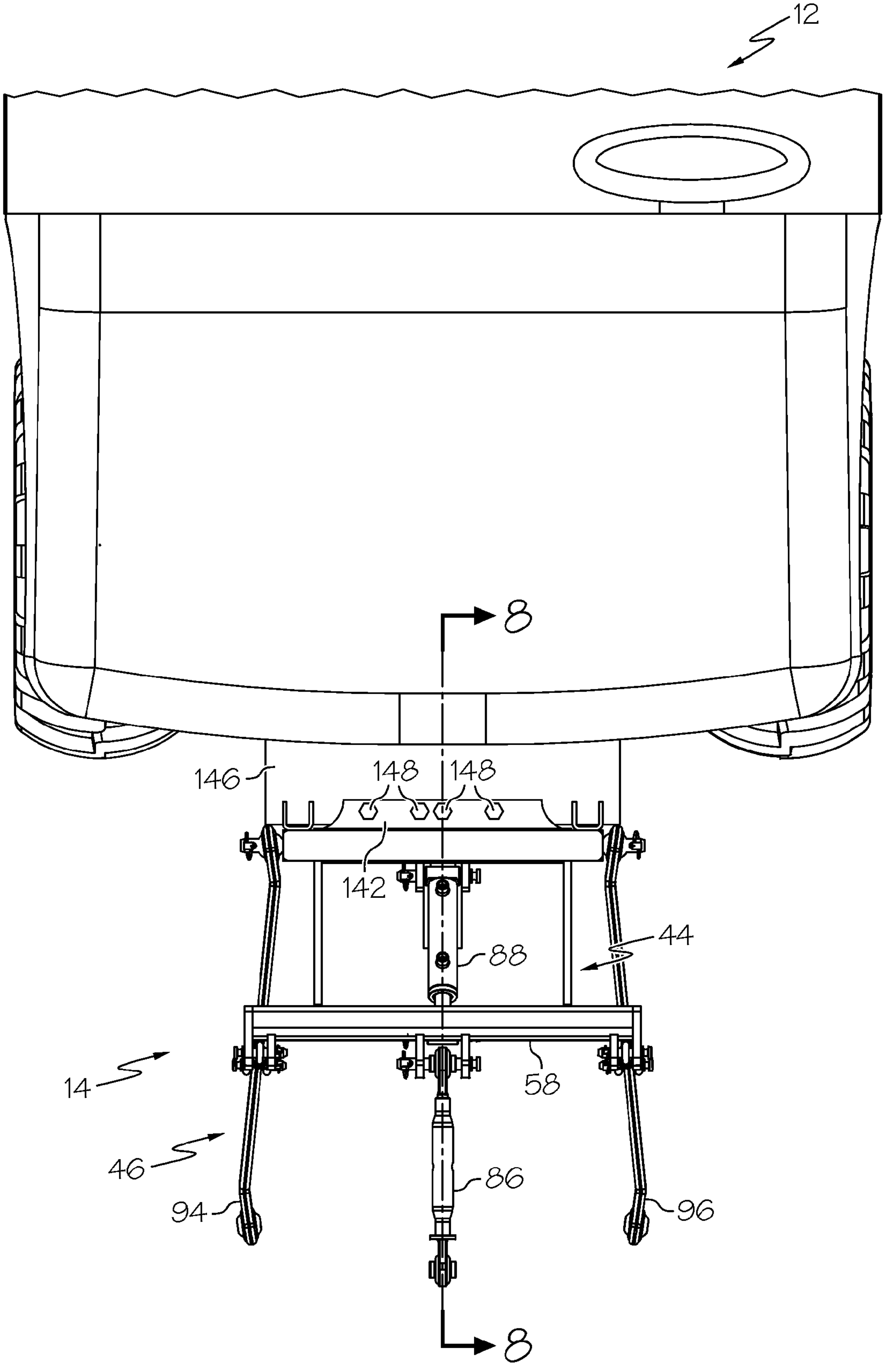
FIG. 7 is a top view of the three-point linkage system of FIG. 3 attached to a front end of the utility vehicle according to one or more embodiments described herein.
Figure 8:
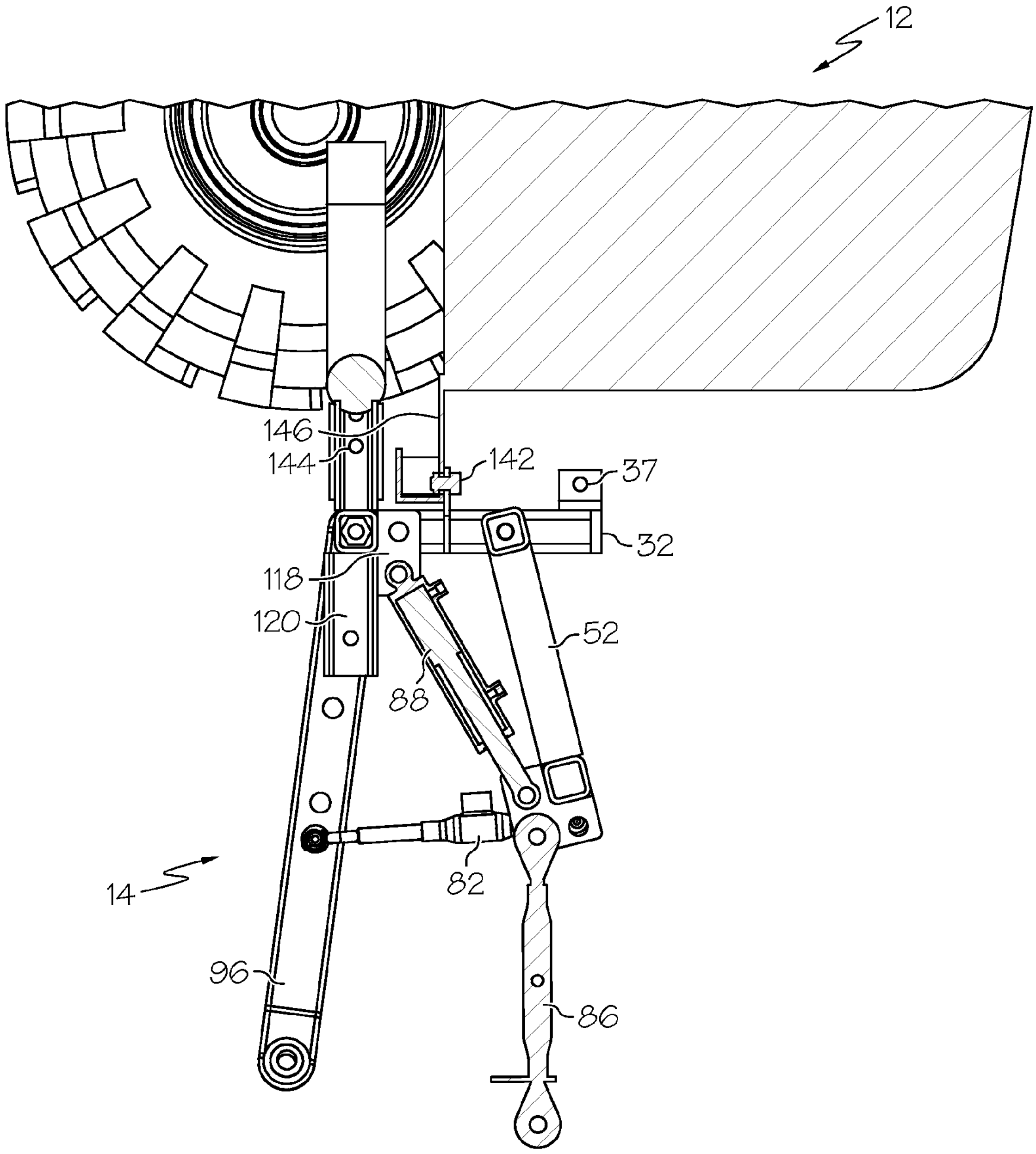
FIG. 8 is a section view of the three-point linkage taken along lines 8-8 of FIG. 7 according to one or more embodiments described herein.

Referring now to FIGS. 7 and 8, the three-point linkage system 14 may also be attached to a front end of the utility vehicle 12. In this embodiment, a cross-support 142, in addition to a receiver hitch 144, are used to connect the three-point linkage system 14 to the front of the utility vehicle 12. In particular, the utility vehicle 12 may include a front end connection plate 146 that is used to connect to the cross-support 142, for example, using fastener bolts 148 or any other suitable connectors. The hitch tube 42 can be received by the receiver hitch 144. Similar to the rear connection described above, the hydraulic actuator 88 may be connected to the hydraulic system 15 of the utility vehicle 12 for lifting and lowering of the upper lift arm assembly 44 and the lower lift arm assembly 46.

The above-described three-point linkage systems can allow various utility vehicles the capability to operate a variety of implements, such as category 0-1 implements, while still allowing use to their cargo beds due to the low profile of the three-point linkage systems. Exemplary implements include fertilizer spreaders, box blades, boom poles, augers, graders, yard pluggers, aerators, carry alls, movers, etc. The three-point linkage systems may be used on a number of utility vehicles, such as those manufactured by Kubota, John Deere, Polaris, Toro and Kioti.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A three-point linkage system comprising:

a frame;

an upper lift arm assembly pivotally mounted to the frame at a pivot axis, the upper lift arm assembly comprising a pair of upper lift arms pivotally mounted to the frame at the pivot axis and extending in a rearward direction from the frame;

a lower lift arm assembly pivotally mounted to the frame, the lower lift arm assembly being linked to the upper lift arm assembly for movement therewith;

an actuator connected to the frame and the upper lift arm assembly to move the upper lift arm assembly and the lower lift arm assembly linked to the upper lift arm assembly relative to the frame; and a top link arm pivotally connected to the upper lift arm assembly such that the top link arm moves with the upper lift arm assembly as the upper lift arm assembly is moved by the actuator, the top link arm including connecting structure for connecting the top link arm to an implement wherein the upper lift arm assembly further includes an outer transverse beam that extends between and is connected to both of the upper lift arms at a location spaced rearward from the pivot axis.

2. The three-point linkage system of claim 1, wherein the upper lift arm assembly includes an inner transverse beam that is pivotally connected to the frame at opposite ends.

3. The three-point linkage system of claim 2, wherein the upper lift arm assembly comprises the pair of upper lift arms that extend in a rearward direction from the inner transverse beam, the pair of upper lift arms rigidly connected to the inner transverse beam such that they pivot therewith.

4. The three-point linkage system of claim 1, wherein the top link arm is pivotally connected to the outer transverse beam.

5. The three-point linkage system of claim 1 further comprising a hitch tube rigidly connected to the frame that is configured to be received by a receiver hitch of a utility vehicle.

6. The three-point linkage system of claim 5 further comprising a receiver hitch rigidly connected to the frame that extends rearwardly for receiving a hitch tube.

7. The three-point linkage system of claim 1 further comprising a turnbuckle attachment connected to the frame, the turnbuckle attachment including a clamp that is configured to connect to an upper transverse support beam of a utility vehicle.

8. The three-point linkage system of claim 1, wherein the lower lift arm assembly includes a pair of lower lift arms that are pivotally connected at opposite sides of the frame, the lower lift arms each including a connecting structure for connecting the lower lift arms to the implement.

9. A utility vehicle system comprising:

a utility vehicle comprising:

a vehicle frame including upper support beams that extend from front to rear of the utility vehicle on opposite sides of the utility vehicle and an upper transverse support beam that extends between the upper support beams;

a hitch receiver connected to the vehicle frame;

a three-point linkage system comprising:

a linkage frame;

a hitch tube connected to the linkage frame, the hitch tube received by the hitch receiver;

an attachment connected to the linkage frame, the attachment including a clamp that is connected to the upper transverse support beam of the utility vehicle;

an upper lift arm assembly pivotally mounted to the linkage frame at a pivot axis, the upper lift arm assembly comprising a pair of upper lift arms pivotally mounted to the linkage frame at the pivot axis and extending in a rearward direction from the linkage frame;

a lower lift arm assembly pivotally mounted to the linkage frame, the lower lift arm assembly being linked to the upper lift arm assembly for movement therewith;

an actuator connected to the linkage frame and the upper lift arm assembly to move the upper lift arm assembly and the lower lift arm assembly linked to the upper lift arm assembly relative to the linkage frame; and a top link arm pivotally connected to the upper lift arm assembly such that the top link arm moves with the upper lift arm assembly as the upper lift arm assembly is moved by the actuator, the top link arm including connecting structure for connecting the top link arm to an implement wherein the upper lift arm assembly further includes an outer transverse beam that extends between and is connected to both of the upper lift arms at a location spaced rearward from the pivot axis.

10. The utility vehicle system of claim 9, wherein the utility vehicle further comprises a cargo bed configured to be raised and lowered.

11. The utility vehicle system of claim 10, wherein the three-point linkage system has a raised configuration and a lowered configuration, wherein the three-point linkage system is configured to allow raising and lowering of the cargo bed with the three-point linkage system in its raised and lowered configurations.

12. The utility vehicle system of claim 9, wherein the upper lift arm assembly includes an inner transverse beam that is pivotally connected to the linkage frame at opposite ends.

13. The utility vehicle system of claim 12, wherein the upper lift arm assembly comprises the pair of upper lift arms that extend in a rearward direction from the inner transverse beam, the pair of upper lift arms rigidly connected to the inner transverse beam such that they pivot therewith.

14. The utility vehicle system of claim 9 further comprising a receiver hitch rigidly connected to the linkage frame that extends rearwardly for receiving a different hitch tube.

15. The utility vehicle system of claim 9, wherein the lower lift arm assembly includes a pair of lower lift arms that are pivotally connected at opposite sides of the frame, the lower lift arms each including a connecting structure for connecting the lower lift arms to the implement.

16. A method of providing a three-point linkage for a utility vehicle, the method comprising:

mounting a three-point linkage system to the utility vehicle by inserting a hitch tube connected to a linkage frame of the three-point linkage system into a hitch receiver of the utility vehicle and connecting an attachment connected to the linkage frame of the three-point linkage system to a vehicle frame of the utility vehicle;

connecting an upper lift arm assembly to an implement, the upper lift arm assembly comprising a pair of upper lift arms pivotally mounted to the linkage frame at a pivot axis and extending in a rearward direction from the linkage frame; and connecting a lower lift arm assembly to the implement, the lower lift arm assembly pivotally mounted to the linkage frame, the lower lift arm assembly being linked to the upper lift arm assembly for movement therewith;

wherein the upper lift arm assembly is connected to the implement through a top link arm, the top link arm pivotally connected to an outer transverse beam extending between and connected to both of the upper lift arms of the upper lift arm assembly at a location spaced rearward from the pivot axis such that the top link arm moves with the upper lift arm assembly.

17. The method of claim 16 further comprising moving the upper lift arm assembly using an actuator connected to the linkage frame and the upper lift arm assembly to raise the upper lift arm assembly and the lower lift arm assembly linked to the upper lift arm assembly relative to the linkage frame.

18. The method of claim 17 further comprising raising a cargo bed of the utility vehicle with the upper lift arm assembly in a raised position.

* * * * *